(12) United States Patent
Kokatsu

(10) Patent No.: US 9,337,729 B2
(45) Date of Patent: May 10, 2016

(54) HIGH EFFICIENCY DC-DC CONVERTER WITH FAST CLOCK OPERATION AND LOAD CHANGE RESPONSE

(71) Applicant: Kabushiki Kaisha Toshiba, Minato-Ku, Tokyo (JP)

(72) Inventor: Hideyuki Kokatsu, Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 45 days.

(21) Appl. No.: 14/490,262

(22) Filed: Sep. 18, 2014

(65) Prior Publication Data

US 2015/0188422 A1 Jul. 2, 2015

(30) Foreign Application Priority Data

Dec. 26, 2013 (JP) ................... 2013-269904

(51) Int. Cl.
| | |
|---|---|
| H02M 3/156 | (2006.01) |
| H02M 3/158 | (2006.01) |
| H02M 3/157 | (2006.01) |
| H02M 3/155 | (2006.01) |

(52) U.S. Cl.
CPC ............. *H02M 3/156* (2013.01); *H02M 3/155* (2013.01); *H02M 3/157* (2013.01); *H02M 3/158* (2013.01)

(58) Field of Classification Search
CPC .......................................... H02M 3/155–3/158
See application file for complete search history.

(56) References Cited

U.S. PATENT DOCUMENTS

| | | | | |
|---|---|---|---|---|
| 6,166,528 | A * | 12/2000 | Rossetti ............. | H02M 3/1588 323/283 |
| 6,424,130 | B1 * | 7/2002 | Fukui ................... | H02M 3/156 323/282 |
| 6,777,919 | B1 * | 8/2004 | Fontan Tarodo ...... | H02M 3/335 323/222 |
| 7,202,642 | B1 | 4/2007 | Chen et al. | |
| 7,268,525 | B2 | 9/2007 | Ishii et al. | |
| 7,592,792 | B2 * | 9/2009 | Ryu ...................... | H02M 3/156 323/284 |
| 2010/0150271 | A1 * | 6/2010 | Brown .................... | G06F 1/08 375/324 |
| 2012/0086422 | A1 | 4/2012 | Ito et al. | |
| 2013/0038310 | A1 * | 2/2013 | Menegoli .............. | H02M 3/156 323/288 |

FOREIGN PATENT DOCUMENTS

| | | |
|---|---|---|
| JP | H06(1994)-225522 | 8/1994 |
| JP | 2007-097361 | 4/2007 |
| JP | 2012-100522 | 5/2012 |

OTHER PUBLICATIONS

Noteworthy Non-linear Hysteresis Control Method as a DC/DC Converter Conrol Method, "Technical Analysis," vol. 27, pp. 1-4 (2009).
2-channel N/N Synchronous Rectification Down Conversion Type DC/DC Conerter IC with our Priprietary Circuit added to the Hysteresis Control Bottom Detection Comparator Method, "New Products," vol. 28. pp. 1-5 (2010).
Naeim Safari, "Design of a DC/DC buck converter for ultra-low power applications in 65nm CMOS Process," 73 pages (Mar. 2012).

* cited by examiner

*Primary Examiner* — Emily P Pham
(74) *Attorney, Agent, or Firm* — White & Case LLP

(57) ABSTRACT

The DC-DC converter includes a reference voltage generating circuit that generates a reference voltage. The DC-DC converter includes a modulation clock signal generating circuit that generates a modulation clock signal. The DC-DC converter includes a modulator that performs modulation of the reference voltage in synchronization with the modulation clock signal and outputs a resulting reference signal. The DC-DC converter includes a first comparator that compares the reference signal and a first feedback signal, which is based on the output voltage, and outputs a signal based on a result of the comparison. The DC-DC converter includes a driver that shapes a waveform of a PWM signal, which is based on the signal output from the first comparator, and outputs the PWM signal with the shaped waveform to the control node.

20 Claims, 7 Drawing Sheets

HIGH EFFICIENCY DC-DC CONVERTER WITH FAST CLOCK OPERATION AND LOAD CHANGE RESPONSE

CROSS-REFERENCE TO RELATED APPLICATION

This application is based upon and claims the benefit of priority from the prior Japanese Patent Application No. 2013-269904, filed on Dec. 26, 2013, the entire contents of which are incorporated herein by reference.

BACKGROUND

1. Field

Embodiments described herein relate generally to a DC-DC converter and a semiconductor integrated circuit.

2. Background Art

Progress of personal digital assistants and other devices has been rapid in recent years. Accordingly, DC-DC converters are being required to achieve larger current, higher efficiency, faster clock operation and faster load change response, in order to drive smaller highly integrated CPUs.

However, the conventional DC-DC converter circuit technology can only achieve a clock frequency of 3 to 4 MHz even if a circuit with an extremely complicated configuration is used for peak current control, and cannot fully satisfy the market demand for the fast load change response.

Thus, ripple injection type DC-DC converters for hysteresis control are being proposed.

DETAILED DESCRIPTION

A DC-DC converter according to an embodiment includes an output voltage terminal at which an output voltage is output, the output voltage terminal being connected to an external load, and the external load being connected between the output voltage terminal and a fixed potential. The DC-DC converter includes a capacitor connected between the output voltage terminal and the fixed potential. The DC-DC converter includes an inductor connected to the output voltage terminal at a first end thereof and to a control node at a second end thereof. The DC-DC converter includes a reference voltage generating circuit that generates a reference voltage. The DC-DC converter includes a modulation clock signal generating circuit that generates a modulation clock signal. The DC-DC converter includes a modulator that performs modulation of the reference voltage in synchronization with the modulation clock signal and outputs a resulting reference signal. The DC-DC converter includes a first comparator that compares the reference signal and a first feedback signal, which is based on the output voltage, and outputs a signal based on a result of the comparison. The DC-DC converter includes a driver that shapes a waveform of a PWM signal, which is based on the signal output from the first comparator, and outputs the PWM signal with the shaped waveform to the control node.

In the following, embodiments will be described with reference to the drawings.

First Embodiment

Figure 1:
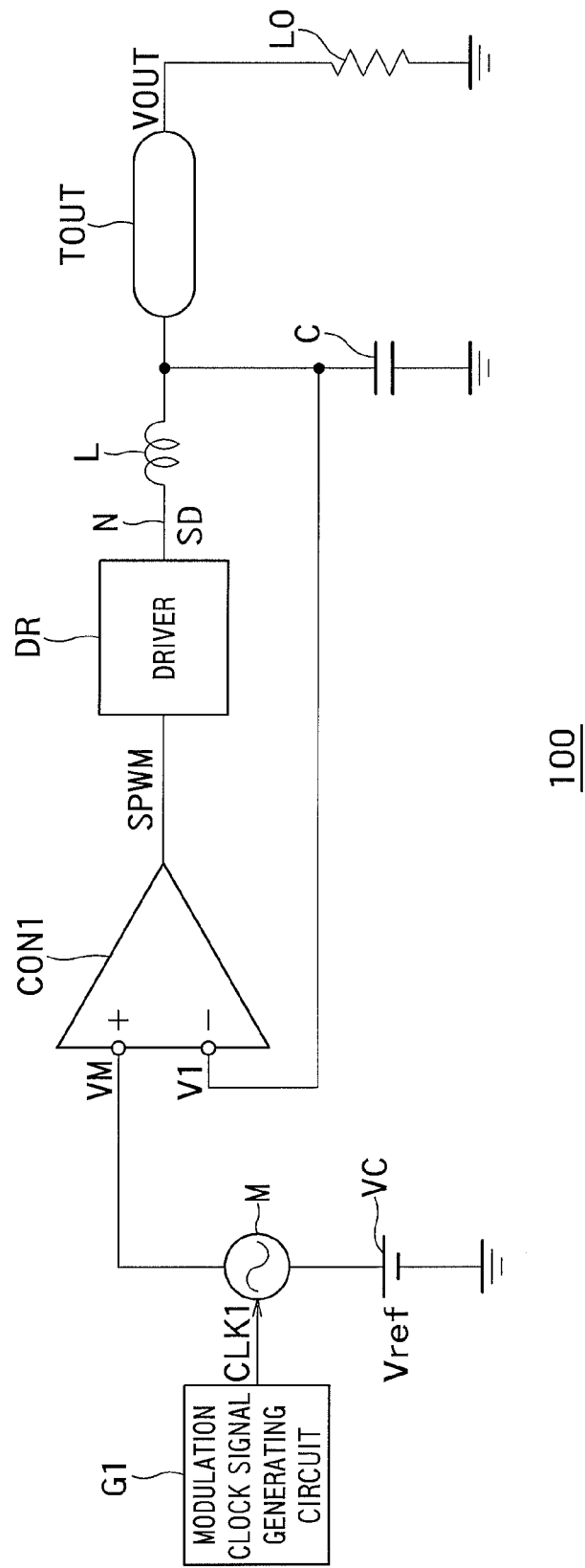
FIG. 1 is a circuit diagram showing an example of a configuration of a DC-DC converter 100 according to a first embodiment.
Figure 2:
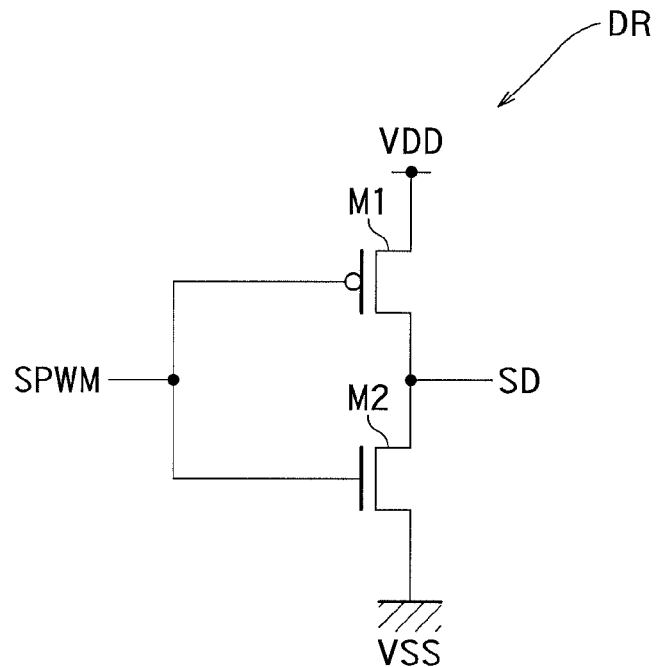
FIG. 2 is a circuit diagram showing an example of a configuration of a driver "DR" of the DC-DC converter 100 shown in FIG. 1.

FIG. 1 is a circuit diagram showing an example of a configuration of a DC-DC converter 100 according to a first embodiment. FIG. 2 is a circuit diagram showing an example of a configuration of a driver "DR" of the DC-DC converter 100 shown in FIG. 1.

As shown in FIG. 1, the DC-DC converter 100 includes an output voltage terminal "TOUT", a capacitor "C", a smoothing inductor "L", a reference voltage generating circuit "VC", a modulation clock signal generating circuit "G1", a first comparator "CON1", a modulator "M", and the driver "DR".

The reference voltage generating circuit "VC", the modulation clock signal generating circuit "G1", the first comparator "CON1", the modulator "M" and the driver "DR" form a semiconductor integrated circuit. However, this semiconductor integrated circuit may include the inductor "L".

As shown in FIG. 1, an external load "LO" is connected between the output voltage terminal "TOUT" and a fixed potential (referred to as a ground hereinafter, as an example). At the output voltage terminal "TOUT", an output voltage "VOUT" is output to the external load "LO".

The capacitor "C" is connected between the output voltage terminal "TOUT" and the ground.

The smoothing inductor "L" is connected to the output voltage terminal "TOUT" at one end thereof and to a control node "N" at another end thereof.

The reference voltage generating circuit "VC" generates a reference voltage "Vref".

The modulation clock signal generating circuit "G1" generates a modulation clock signal "CLK1".

The modulator "M" performs modulation of the reference voltage "Vref" in synchronization with the modulation clock signal "CLK1" and outputs a resulting reference signal "VM". The reference signal "VM" is a modulated wave (a triangular wave or a sinusoidal wave, for example) having a minute amplitude with respect to the reference voltage "Vref".

The first comparator "CON1" compares the reference signal "VM" and a first feedback signal "V1", which is based on the output voltage "VOUT", and outputs a signal based on a result of the comparison.

In the example shown in FIG. 1, the signal output from the first comparator "CON1" is a PWM signal "SPWM". In the example shown in FIG. 1, furthermore, the first feedback signal "V1" is the output voltage "VOUT".

The driver "DR" shapes the waveform of the PWM (pulse width modulation) signal "SPWM", which is based on the signal output from the first comparator "CON1", and outputs a drive signal "SD" with the shaped waveform to the control node "N".

As shown in FIG. 2, the driver "DR" has a pMOS transistor "M1" and an nMOS transistor "M2", for example.

The pMOS transistor "M1" is connected to a power supply at a source thereof and to the control node "N" at a drain thereof. The pMOS transistor "M1" receives the PWM signal "SPWM" at a gate thereof.

The nMOS transistor "M2" is connected to the control node "N" at a drain thereof and to the ground at a source thereof, and receives the PWM signal "SPWM" at a gate thereof.

The driver "DR" shown in FIG. 2 outputs a power supply voltage "VDD" as the signal "SD" to the control node "N" if the PWM signal "SPWM" is at a "High" level.

On the other hand, the driver "DR" outputs a ground voltage "VSS" as the drive signal "SD" to the control node "N" if the PWM signal "SPWM" is at a "Low" level.

Next, operational characteristics of the DC-DC converter according to this embodiment configured as described above will be described.

Figure 3:
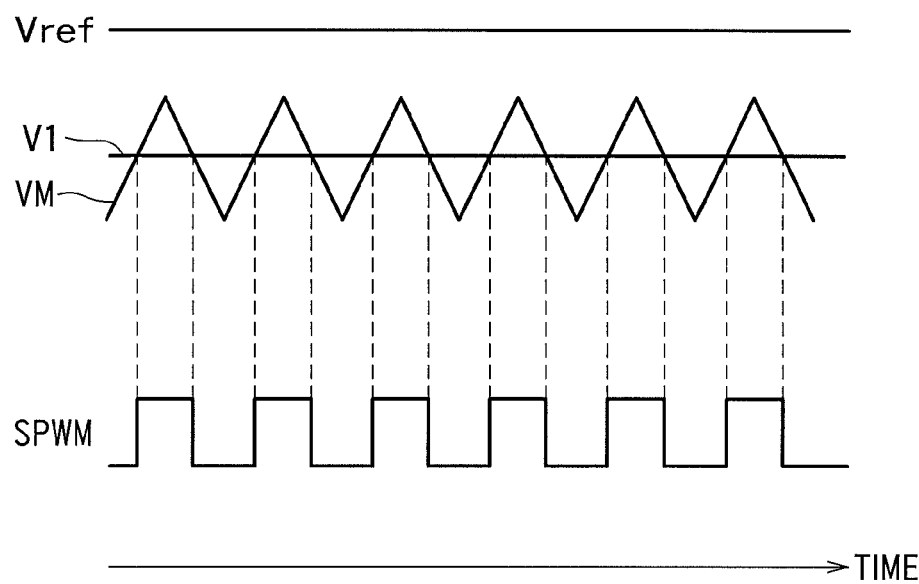
FIG. 3 is a diagram showing an example of a waveform of each signal involved with the DC-DC converter 100 shown in FIG. 1.

FIG. 3 is a diagram showing an example of a waveform of each signal involved with the DC-DC converter 100 shown in FIG. 1.

As shown in FIG. 3, the reference voltage "Vref" generated by the reference voltage generating circuit "VC" has a constant value.

The reference signal "VM" is modulated by the modulator "M" with respect to the reference voltage "Vref" in synchronization with the modulation clock signal "CLK1". In the example shown in FIG. 3, the reference signal "VM" is a triangular wave.

As described above, the first comparator "CON1" compares the reference signal "VM" and the first feedback signal "V1", which is based on the output voltage "VOUT", and outputs a signal (PWM signal "SPWM") based on the result of the comparison.

For example, as shown in FIG. 3, when the first feedback signal "V1" is lower than the reference signal "VM", the first comparator "CON1" sets the PWM signal "SPWM" at the "Low" level.

On the other hand, when the first feedback signal "V1" is equal to or higher than the reference signal "VM", the first comparator "CON1" sets the PWM signal "SPWM" at the "High" level.

The driver "DR" then shapes the waveform of the PWM signal "SPWM" and outputs the resulting drive signal "SD" with the shaped waveform to the control node "N". The drive signal "SD" is smoothed by the inductor "L" and the capacitor "C", and the smoothed drive signal "SD" is output as the output voltage "VOUT" to the output terminal "TOUT".

As can be seen from the above description, the DC-DC converter 100, which has an extremely simple configuration, modulates the reference voltage "Vref" with a sinusoidal wave or the like and compares the modulated reference voltage "Vref" with a feedback signal from the output voltage "VOUT", thereby providing the PWM signal "SPWM" having a pulse width responsive to the output voltage "VOUT". For example, in a case where the reference signal "VM" is a triangular wave, a sawtooth wave or the like, the PWM signal "SPWM" can have a pulse width proportional to the output voltage "VOUT". The DC-DC converter 100 can be reduced in circuit size and is highly competitive in terms of cost.

With the DC-DC converter 100 according to this embodiment, unlike a conventional hysteresis converter, the switching frequency is determined by an internal clock. Therefore, the DC-DC converter 100 according to this embodiment overcomes the drawback of the conventional hysteresis converter that the switching frequency cannot be positively determined.

Furthermore, with the DC-DC converter 100 according to this embodiment, unlike a conventional DC-DC converter, there is no factor that imposes an upper limit on the clock frequency of the control loop of the DC-DC converter. Therefore, the DC-DC converter 100 according to this embodiment has an advantage that the switching frequency can be increased as far as the operational speed of the comparator permits.

Furthermore, with the DC-DC converter 100 according to this embodiment, the switching frequency is extremely quickly synchronized with the frequency of the reference signal "VM", so that the DC-DC converter 100 according to this embodiment is extremely highly responsive to an external change.

As described above, the DC-DC converter according to this embodiment can achieve a fast clock operation and a fast load change response while achieving high efficiency.

Second Embodiment

Figure 4:
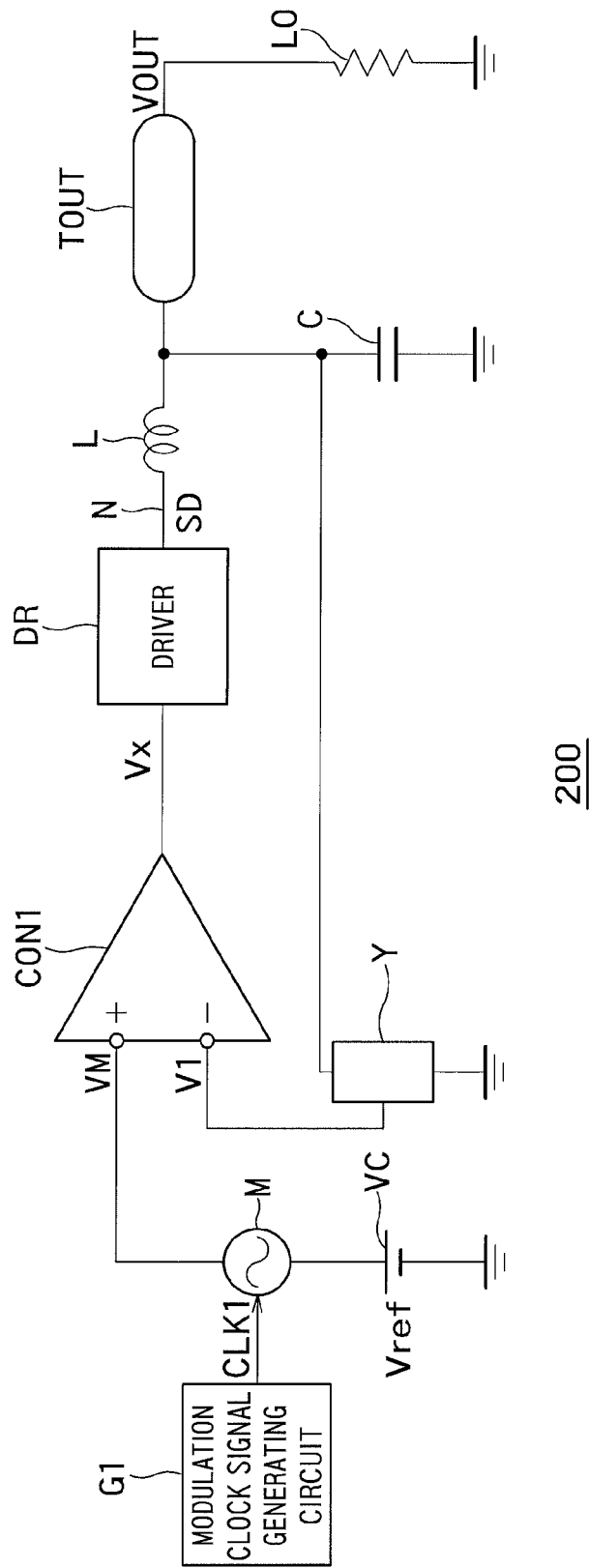
FIG. 4 is a circuit diagram showing an example of a configuration of a DC-DC converter 200 according to a second embodiment.

FIG. 4 is a circuit diagram showing an example of a configuration of a DC-DC converter 200 according to a second embodiment.

As shown in FIG. 4, the DC-DC converter 200 includes the output voltage terminal "TOUT", the capacitor "C", the smoothing inductor "L", the reference voltage generating circuit "VC", the modulation clock signal generating circuit "G1", the first comparator "CON1", the modulator "M", the driver "DR", and a voltage dividing circuit "Y".

In short, the DC-DC converter 200 according to the second embodiment differs from the DC-DC converter 100 according to the first embodiment in that the DC-DC converter 200 further includes the voltage dividing circuit "Y".

The voltage dividing circuit "Y", the reference voltage generating circuit "VC", the modulation clock signal generating circuit "G1", the first comparator "CON1", the modulator "M" and the driver "DR" form a semiconductor integrated circuit. However, this semiconductor integrated circuit may include the inductor "L".

As shown in FIG. 4, the voltage dividing circuit "Y" is connected between the output voltage terminal "TOUT" and the ground. The voltage dividing circuit "Y" divides the output voltage "VOUT" at a first voltage division ratio and outputs a resulting first division voltage. In the example shown in FIG. 4, the first feedback signal "V1" is responsive to the first division voltage.

The first comparator "CON1" compares the reference voltage "VM" and the first feedback signal "V1", which is the first division voltage based on the output voltage "VOUT", and outputs a signal (PWM signal "SPWM") based on a result of the comparison.

With the DC-DC converter 100 according to the first embodiment described earlier, the output voltage "VOUT" is controlled to be equal to the reference signal "VM", so that the output voltage "VOUT" is equal to the reference voltage.

On the other hand, the DC-DC converter 200 according to the second embodiment further includes the voltage dividing circuit "Y", which is formed by a resistor, so that the output voltage "VOUT" is the product of the voltage division ratio (the first voltage division ratio) of the resistor and the reference signal "VM". Therefore, the output voltage "VOUT" can be adjusted by changing the voltage division ratio of the resistor.

The remainder of the configuration and function of the DC-DC converter 200 according to the second embodiment is the same as that of the DC-DC converter 100 according to the first embodiment.

That is, as with the DC-DC converter according to the first embodiment, the DC-DC converter according to this embodiment can achieve a fast clock operation and a fast load change response while achieving high efficiency.

Third Embodiment

Figure 5:
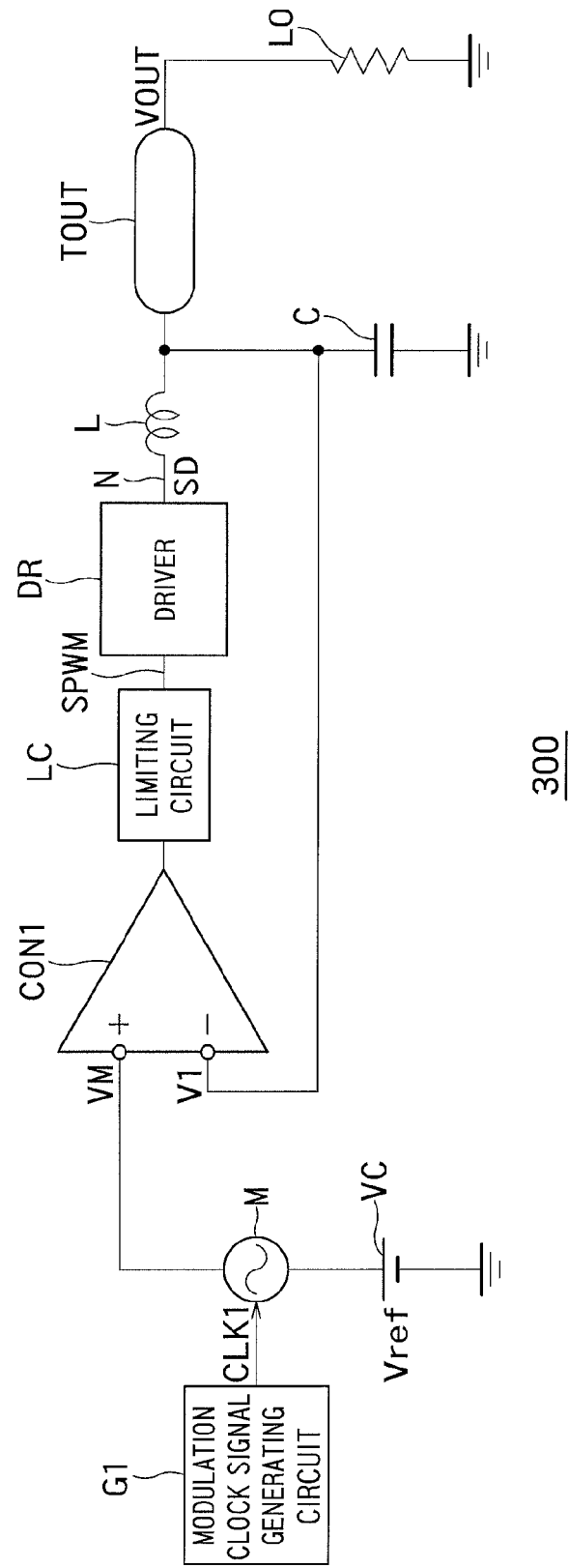
FIG. 5 is a circuit diagram showing an example of a configuration of a DC-DC converter 300 according to a third embodiment.

FIG. 5 is a circuit diagram showing an example of a configuration of a DC-DC converter 300 according to a third embodiment.

As shown in FIG. 5, the DC-DC converter 300 includes the output voltage terminal "TOUT", the capacitor "C", the smoothing inductor "L", the reference voltage generating circuit "VC", the modulation clock signal generating circuit "G1", the first comparator "CON1", the modulator "M", the driver "DR", and a limiting circuit "LC".

In short, the DC-DC converter 300 according to the third embodiment differs from the DC-DC converter 100 according to the first embodiment in that the DC-DC converter 300 further includes the limiting circuit "LC".

The limiting circuit "LC", the reference voltage generating circuit "VC", the modulation clock signal generating circuit "G1", the first comparator "CON1", the modulator "M" and the driver
"DR" form a semiconductor integrated circuit. However, this semiconductor integrated circuit may include the inductor "L".

As shown in FIG. 5, the limiting circuit "LC" limits a duty cycle of the PWM signal "SPWM" within a predetermined range. Therefore, the output voltage "VOUT" can be limited within a predetermined voltage range.

The remainder of the configuration and function of the DC-DC converter 300 according to the third embodiment is the same as that of the DC-DC converter 100 according to the first embodiment.

That is, as with the DC-DC converter according to the first embodiment, the DC-DC converter according to this embodiment can achieve a fast clock operation and a fast load change response while achieving high efficiency.

Fourth Embodiment

Figure 6:
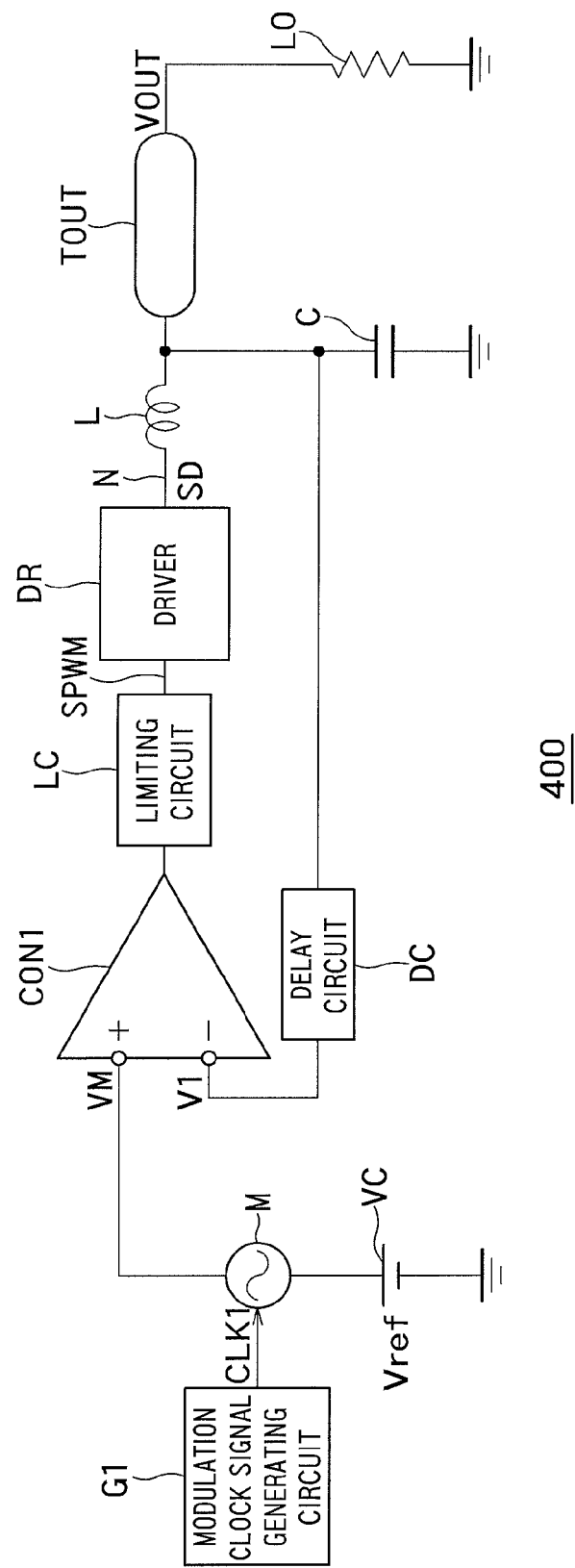
FIG. 6 is a circuit diagram showing an example of a configuration of a DC-DC converter 400 according to a fourth embodiment.

FIG. 6 is a circuit diagram showing an example of a configuration of a DC-DC converter 400 according to a fourth embodiment.

As shown in FIG. 6, the DC-DC converter 400 includes the output voltage terminal "TOUT", the capacitor "C", the smoothing inductor "L", the reference voltage generating circuit "VC", the modulation clock signal generating circuit "G1", the first comparator "CON1", the modulator "M", the driver "DR", the limiting circuit "LC" and a delay circuit "DC".

In short, the DC-DC converter 400 according to the fourth embodiment differs from the DC-DC converter 300 according to the third embodiment in that the DC-DC converter 400 further includes the delay circuit "DC".

The delay circuit "DC", the limiting circuit "LC", the reference voltage generating circuit "VC", the modulation clock signal generating circuit "G1", the first comparator "CON1", the modulator "M" and the driver "DR" form a semiconductor integrated circuit. However, this semiconductor integrated circuit may include the inductor "L".

As shown in FIG. 6, the delay circuit "DC" delays a change in the first feedback signal "V1" that occurs in response to a change in the output voltage "VOUT" by a preset delay time. The delay time is set based on delays of signals in the limiting circuit "LC", the driver "DR" and the inductor "L".

In this way, the phase of the first feedback signal "V1" can be adjusted, and oscillation of the output voltage "VOUT" can be suppressed.

The remainder of the configuration and function of the DC-DC converter 400 according to the fourth embodiment is the same as that of the DC-DC converter 100 according to the first embodiment.

That is, as with the DC-DC converter according to the first embodiment, the DC-DC converter according to this embodiment can achieve a fast clock operation and a fast load change response while achieving high efficiency.

Fifth Embodiment

Figure 7:
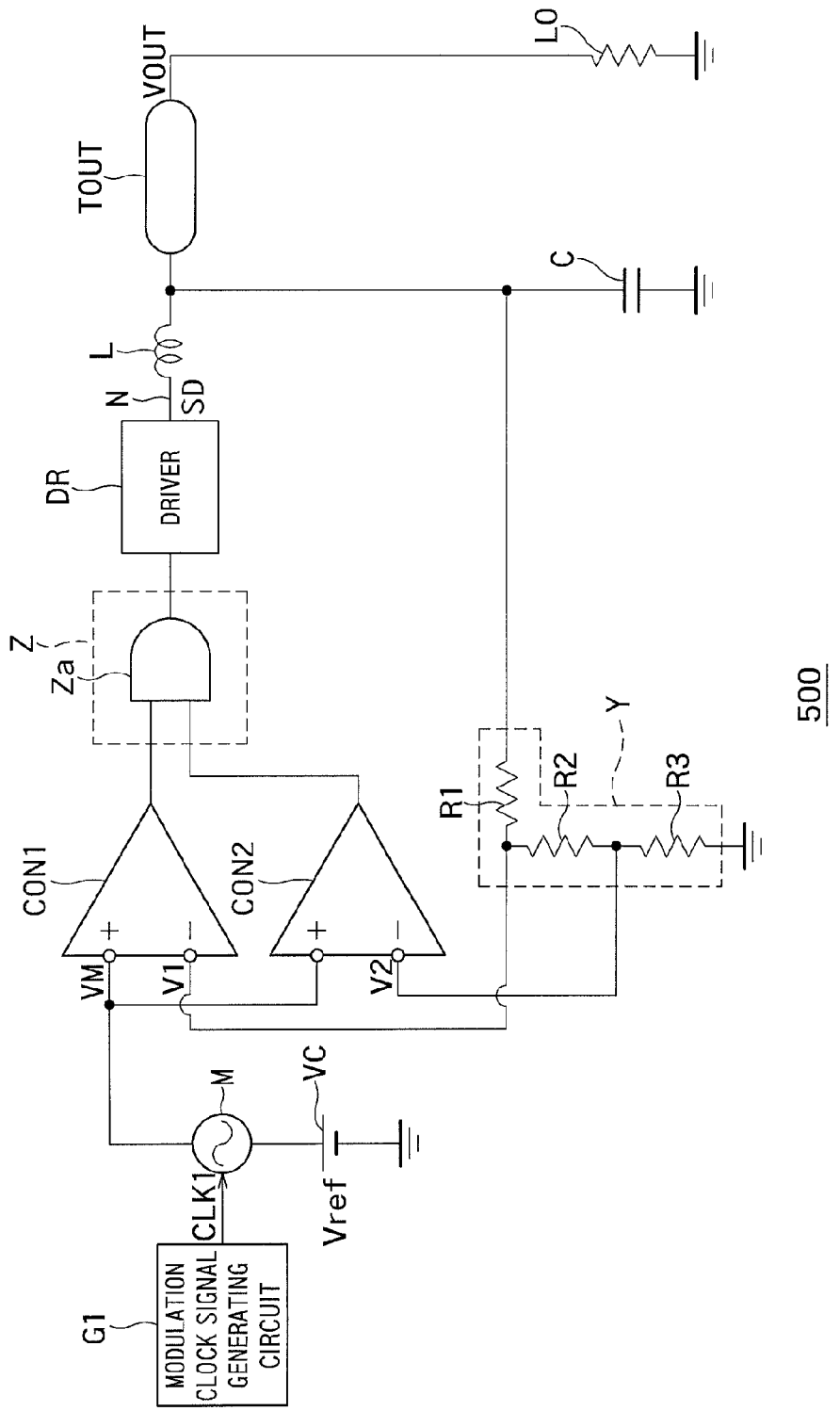
FIG. 7 is a circuit diagram showing an example of a configuration of a DC-DC converter 500 according to a fifth embodiment.

FIG. 7 is a circuit diagram showing an example of a configuration of a DC-DC converter 500 according to a fifth embodiment.

As shown in FIG. 7, the DC-DC converter 500 includes the output voltage terminal "TOUT", the capacitor "C", the smoothing inductor "L", the reference voltage generating circuit "VC", the modulation clock signal generating circuit "G1", the first comparator "CON1", a second comparator "CON2", the modulator "M", the driver "DR", an arithmetic circuit "Z", and the voltage dividing circuit "Y".

In short, the DC-DC converter 500 according to the fifth embodiment differs from the DC-DC converter 100 according to the first embodiment in that the DC-DC converter 500 further includes the second comparator "CON2", the arithmetic circuit "Z" and the voltage dividing circuit "Y".

The second comparator "CON2", the arithmetic circuit "Z", the voltage dividing circuit "Y", the reference voltage generating circuit "VC", the modulation clock signal generating circuit "G1", the first comparator "CON1", the modulator "M" and the driver "DR" form a semiconductor integrated circuit. However, this semiconductor integrated circuit may include the inductor "L".

In the fifth embodiment, the voltage dividing circuit "Y" divides the output voltage "VOUT" at a second voltage division ratio that is different from the first voltage division ratio and outputs a resulting second division voltage.

As shown in FIG. 7, the voltage dividing circuit "Y" has a first voltage dividing resistor "R1", a second voltage dividing resistor "R2" and a third voltage dividing resistor "R3", for example.

The first voltage dividing resistor "R1" is connected to the output voltage terminal "TOUT" at one end thereof.

The second voltage dividing resistor "R2" is connected to another end of the first voltage dividing resistor "R1" at one end thereof.

The third voltage dividing resistor "R3" is connected to another end of the second voltage dividing resistor "R2" at one end thereof and to the ground at another end thereof.

The voltage dividing circuit "Y" divides the output voltage "VOUT" at a ratio between the resistance of the first voltage dividing resistor "R1" and the combined resistance of the second and third voltage dividing resistors "R2" and "R3" and outputs the resulting voltage, that is, a voltage at a point between the first voltage dividing resistor "R1" and the second voltage dividing resistor "R2", as a first division voltage (the first feedback signal "V1").

In addition, the voltage dividing circuit "Y" divides the output voltage "VOUT" at a ratio between the combined resistance of the first and second voltage dividing resistors "R1" and "R2" and the resistance of the third voltage dividing resistor "R3" and outputs the resulting voltage, that is, a voltage at a point between the second voltage dividing resistor "R2" and the third voltage dividing resistor "R3", as a second division voltage (a second feedback signal "V2").

The first comparator "CON1" compares the reference signal "VM" and the first division voltage (the first feedback signal "V1") and outputs a signal based on a result of the comparison.

The second comparator "CON2" compares the reference signal "VM" and the second division voltage (the second feedback signal "V2") and outputs a signal based on a result of the comparison.

The arithmetic circuit "Z" performs an arithmetic operation of the signal output from the first comparator "CON1" and the signal output from the second comparator "CON2" and outputs a signal responsive to a result of the arithmetic operation as the PWM signal "SPWM".

In the example shown in FIG. 7, the arithmetic circuit "Z" is an AND circuit "Za". Alternatively, the arithmetic circuit "Z" may be an OR circuit or other logic circuit.

With the configuration described above, even if one of the first comparator "CON1" and the second comparator "CON2" erroneously operates because of noise, there is no problem in the operation of the DC-DC converter as a whole as far as the other comparator normally operates. Thus, the configuration has an advantage of high noise resistance.

The remainder of the configuration and function of the DC-DC converter 500 according to the fifth embodiment is the same as that of the DC-DC converter 100 according to the first embodiment.

That is, as with the DC-DC converter according to the first embodiment, the DC-DC converter according to this embodiment can achieve a fast clock operation and a fast load change response while achieving high efficiency.

Sixth Embodiment

Figure 8:
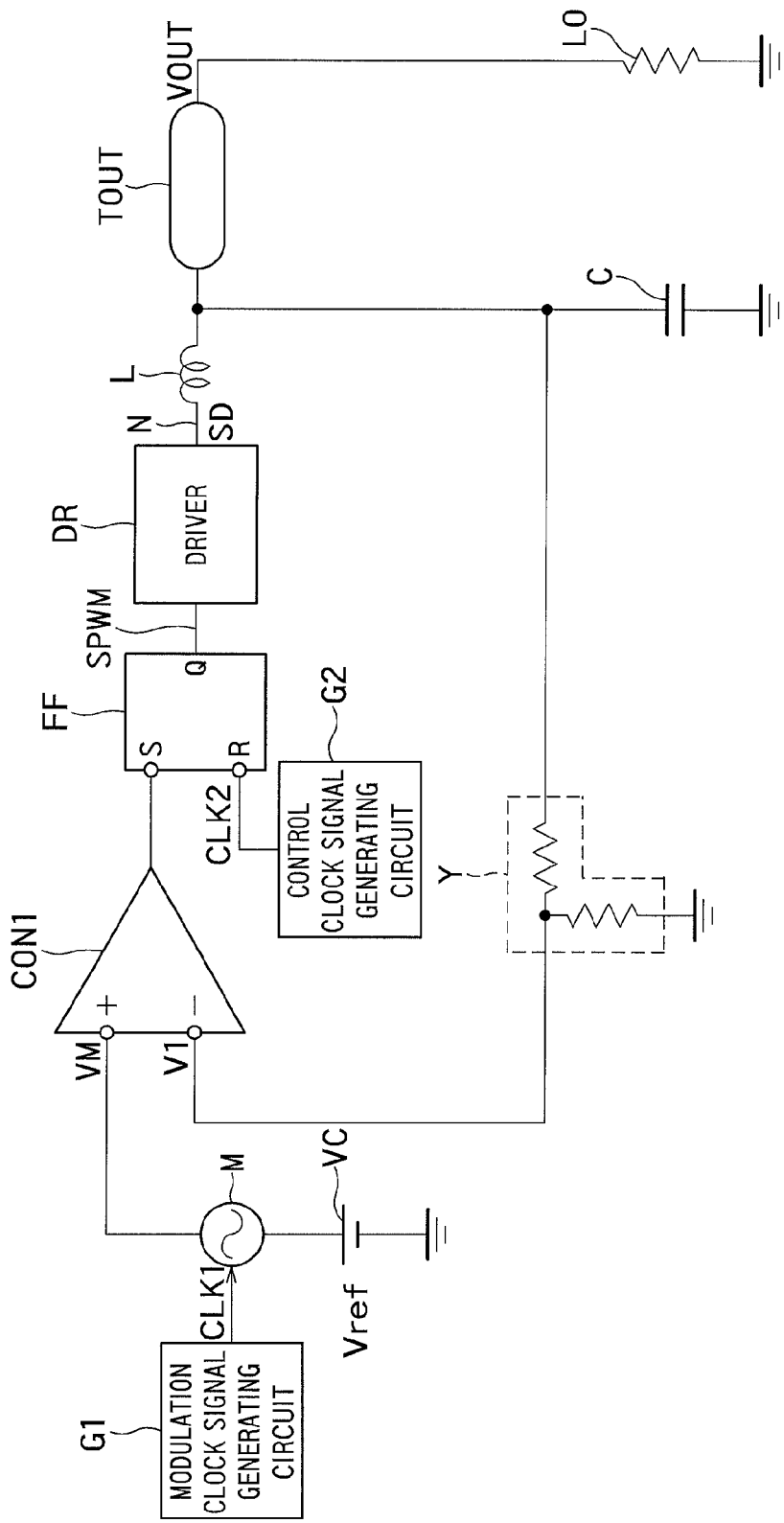
FIG. 8 is a circuit diagram showing an example of a configuration of a DC-DC converter 600 according to a sixth embodiment.

FIG. 8 is a circuit diagram showing an example of a configuration of a DC-DC converter 600 according to a sixth embodiment.

As shown in FIG. 8, the DC-DC converter 600 includes the output voltage terminal "TOUT", the capacitor "C", the smoothing inductor "L", the reference voltage generating circuit "VC", the modulation clock signal generating circuit "G1", a control clock signal generating circuit "G2", the first comparator "CON1", the modulator "M", the driver "DR", the voltage dividing circuit "Y" and a flip-flop "FF".

In short, the DC-DC converter 600 according to the sixth embodiment differs from the DC-DC converter 200 according to the second embodiment in that the DC-DC converter 600 further includes the control clock signal generating circuit "G2" and the flip-flop "FF".

The flip-flop "FF", the second clock signal generating circuit "G2", the reference voltage generating circuit "VC", the modulation clock signal generating circuit "G1", the first comparator "CON1", the modulator "M", the driver "DR", and the voltage dividing circuit "Y" form a semiconductor integrated circuit. However, this semiconductor integrated circuit may include the inductor "L".

The control clock signal generating circuit "G2" generates a control clock signal "CLK2". The control clock signal "CLK2" may be the same as the modulation clock signal "CLK1". In that case, the modulation clock signal generating circuit "G1" can be the same as the control clock signal generating circuit "G2".

The flip-flop "FF" receives the signal output from the first comparator "CON1" at a set terminal "S" thereof and the control clock signal "CLK2" at a reset terminal "R" thereof and outputs the PWM signal "SPWM" at an output terminal "Q".

That is, the PWM signal "SPWM" is a signal responsive to the difference between an edge of the output signal of the first comparator "CON1" and an edge of the control clock signal "CLK2".

As a result, the synchronization between the PWM signal "SPWM" and the clock signal can be improved.

The remainder of the configuration and function of the DC-DC converter 600 according to the sixth embodiment is the same as that of the DC-DC converter 200 according to the second embodiment.

That is, as with the DC-DC converter according to the second embodiment, the DC-DC converter according to this embodiment can achieve a fast clock operation and a fast load change response while achieving high efficiency.

While certain embodiments have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. A DC-DC converter comprising:
    an output voltage terminal at which an output voltage is output, the output voltage terminal being connected to an external load, and the external load being connected between the output voltage terminal and a fixed potential;
    a capacitor connected between the output voltage terminal and the fixed potential;
    an inductor connected to the output voltage terminal at a first end thereof and to a control node at a second end thereof;
    a reference voltage generating circuit that generates a reference voltage;
    a modulation clock signal generating circuit that generates a modulation clock signal;
    a modulator that performs modulation of the reference voltage in synchronization with the modulation clock signal and outputs a resulting reference signal;
    a first comparator that compares the resulting reference signal and a first feedback signal, which is based on the output voltage, and outputs a signal based on a result of the comparison; and
    a driver that shapes a waveform of a PWM signal, which is based on the signal output from the first comparator, and outputs the PWM signal with a shaped waveform to the control node.

2. The DC-DC converter according to claim 1, further comprising a limiting circuit that limits a duty cycle of the PWM signal within a predetermined range.

3. The DC-DC converter according to claim 2, further comprising a delay circuit that delays a change in the first feedback signal that occurs in response to a change in the output voltage by a preset delay time.

4. The DC-DC converter according to claim 1, further comprising a voltage dividing circuit that is connected between the output voltage terminal and the fixed potential, divides the output voltage at a first voltage division ratio and outputs a resulting first division voltage, wherein the first feedback signal is the first division voltage.

5. The DC-DC converter according to claim 4, wherein the voltage dividing circuit divides the output voltage at a second voltage division ratio that is different from the first voltage division ratio and outputs a resulting second division voltage as a second feedback signal, and the DC-DC converter further comprises:
a second comparator that compares the reference signal and the second feedback signal and outputs a signal based on a result of the comparison; and
an arithmetic circuit that performs an arithmetic operation of the signal output from the first comparator and the signal output from the second comparator and outputs a signal responsive to a result of the arithmetic operation as the PWM signal.

6. The DC-DC converter according to claim 1, further comprising a flip-flop that receives the signal output from the first comparator at a set terminal thereof and a control clock signal at a reset terminal thereof and outputs the PWM signal at an output terminal thereof.

7. The DC-DC converter according to claim 1, wherein the signal output from the first comparator is the PWM signal.

8. The DC-DC converter according to claim 5, wherein the arithmetic circuit is an AND circuit or an OR circuit.

9. The DC-DC converter according to claim 3, wherein the delay time is set based on delays of signals in the limiting circuit, the driver and the inductor.

10. The DC-DC converter according to claim 6, wherein the control clock signal is the modulation clock signal.

11. A semiconductor integrated circuit used in a DC-DC converter including an output voltage terminal at which an output voltage is output, an external load being connected between the output voltage terminal and a fixed potential, a capacitor connected between the output voltage terminal and the fixed potential, and an inductor connected to the output voltage terminal at a first end thereof and to a control node at a second end thereof, the semiconductor integrated circuit comprising:

a reference voltage generating circuit that generates a reference voltage;
a modulation clock signal generating circuit that generates a modulation clock signal;
a modulator that performs modulation of the reference voltage in synchronization with the modulation clock signal and outputs a resulting reference signal;
a first comparator that compares the resulting reference signal and a first feedback signal, which is based on the output voltage, and outputs a signal based on a result of the comparison; and
a driver that shapes a waveform of a PWM signal, which is based on the signal output from the first comparator, and outputs the PWM signal with a shaped waveform to the control node.

12. The semiconductor integrated circuit according to claim 11, further comprising a limiting circuit that limits a duty cycle of the PWM signal within a predetermined range.

13. The semiconductor integrated circuit according to claim 12, further comprising a delay circuit that delays a change in the first feedback signal that occurs in response to a change in the output voltage by a preset delay time.

14. The semiconductor integrated circuit according to claim 11, further comprising a voltage dividing circuit that is connected between the output voltage terminal and the fixed potential, divides the output voltage at a first voltage division ratio and outputs a resulting first division voltage, wherein the first feedback signal is the first division voltage.

15. The semiconductor integrated circuit according to claim 14, wherein the voltage dividing circuit divides the output voltage at a second voltage division ratio that is different from the first voltage division ratio and outputs a resulting second division voltage as a second feedback signal, and the semiconductor integrated circuit further comprises:
a second comparator that compares the reference signal and the second feedback signal and outputs a signal based on a result of the comparison; and
an arithmetic circuit that performs an arithmetic operation of the signal output from the first comparator and the signal output from the second comparator and outputs a signal responsive to a result of the arithmetic operation as the PWM signal.

16. The semiconductor integrated circuit according to claim 11, further comprising a flip-flop that receives the signal output from the first comparator at a set terminal thereof and a control clock signal at a reset terminal thereof and outputs the PWM signal at an output terminal thereof.

17. The semiconductor integrated circuit according to claim 11, wherein the signal output from the first comparator is the PWM signal.

18. The semiconductor integrated circuit according to claim 15, wherein the arithmetic circuit is an AND circuit or an OR circuit.

19. The semiconductor integrated circuit according to claim 13, wherein the delay time is set based on delays of signals in the limiting circuit, the driver and the inductor.

20. The semiconductor integrated circuit according to claim 16, wherein the control clock signal is the modulation clock signal.

* * * * *